Feb. 15, 1944.  A. W. HULL  2,341,920
ELECTRICAL DISCHARGE DEVICE
Filed May 7, 1942
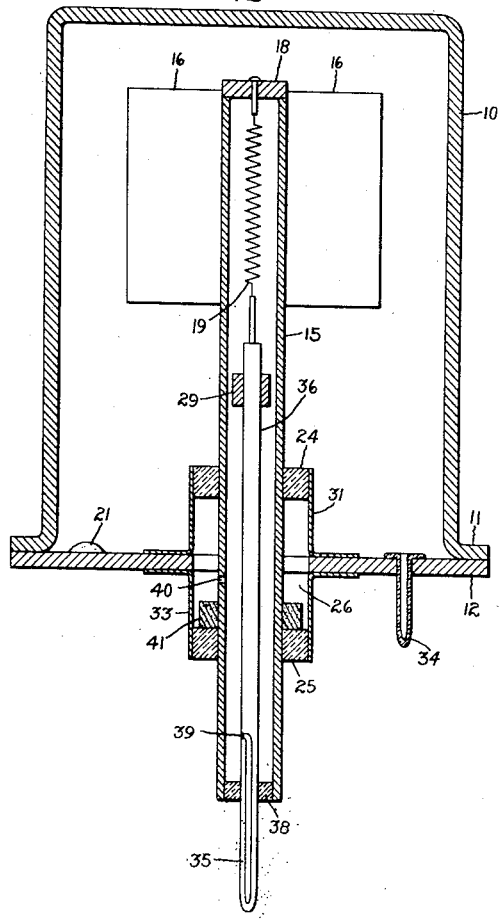
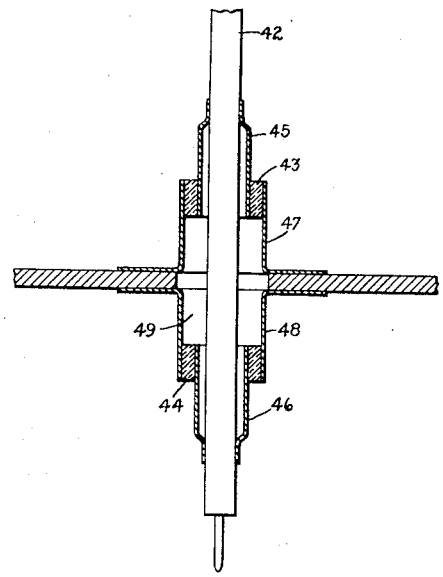
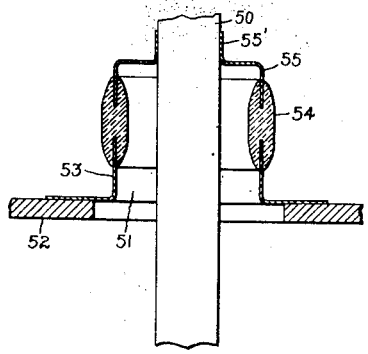
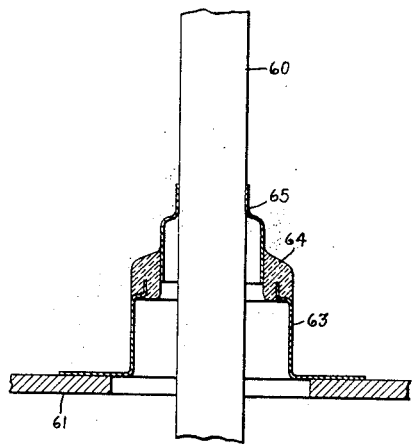
Inventor:
Albert W. Hull,
by Harry E. Dunham
His Attorney.

Patented Feb. 15, 1944

2,341,920

UNITED STATES PATENT OFFICE 2,341,920

ELECTRICAL DISCHARGE DEVICE

Albert W. Hull, Schenectady, N. Y., assignor to General Electric Company, a corporation of New York Application May 7, 1942, Serial No. 442,005

12 Claims. (Cl. 250—27.5).

The present invention relates to electrical devices which employ a chemically active operating medium enclosed within a sealed container and is primarily applicable in connection with electric discharge devices.

Extensive use is now made of discharge devices which employ an ionizable substance such as mercury vapor for the purpose of reducing the voltage drop in the discharge and for increasing the current-carrying capacity of the device. While other vaporous media than mercury have been proposed for this use, several of the media which appear most suitable from an electrical standpoint have until the present time not come into general use because of their unfavorable chemical properties. A particular example of a medium of this kind is caesium, which has highly attractive characteristics as a discharge-supporting medium, but which is so active chemically as to create great difficulty with respect to its confinement in a hermetically sealed discharge space. In particular, caesium vapor has the property of attacking the glasses ordinarily used in the electronics art for the purpose of providing vacuum-tight lead-in seals, which means that seals formed of these glasses cannot be employed in connection with caesium-filled devices. Moreover, caesium vapor at the temperature at which its desirable properties are obtained attacks the interfacial oxide layer between metal and glass, so that seals made by ordinary techniques do not remain tight in service.

It is one object of the present invention to provide an improved lead-in arrangement which is capable of use in a caesium-filled discharge device and which, when so used, is not materially susceptible to chemical attack. In this connection I make use of certain glasses which are caesium resistant but which may not be sufficiently resistant to the effect of air, especially moist air, to permit their use in simple seal constructions. In accordance with the invention, means are provided by which the favorable properties of these glasses can be effectively utilized while at the same time avoiding harmful effects attributable to their unfavorable properties. Broadly, this is accomplished by a lead-in seal construction having a caesium-resistant component which is exposed to the caesium-containing enclosure and a second, air-resistant component which shields the first component from contact with air and which is shielded by such component from contact with caesium.

Another aspect of the invention comprises the use of an air-resistant seal which is protected from contact with caesium vapor by a second caesium-resistant seal, the space between the two seals being evacuated. If this evacuation is carried out pari passu with the evacuation of the envelope, the caesium-resistant seal will never be subjected to any pressure greater than that of the caesium vapor, which is less than one ten thousandth of atmospheric pressure. Hence, this seal may be made of very thin metal, thus minimizing strain from thermal expansion. In particular, in a preferred case it may be made of thin platinum, which has been found to make a vacuum-tight joint with many glasses. This construction allows a wide choice of caesium-resistant glasses, which may or may not be air resistant, and which need not match the metal of the seal in thermal expansion. Moreover, this construction permits the use of caesium-resistant seals which are not tight enough to exclude air. For example, certain seals made in pure hydrogen are immune to caesium, but have a very weak bond between metal and glass, which may yield to thermal expansion without breaking the glass or otherwise injuring the seal, but allowing a very slight leakage. Also, certain seals made in air may have the interfacial oxide reduced by caesium without breaking the glass, but allowing slight leakage. In either case, if the seal is backed by an evacuated cavity, the leakage of caesium through the seal will be so small, because of the low caesium pressure, as to be unharmful.

The features desired to be protected herein are pointed out in the appended claims. The invention itself, together with further objects and advantages thereof, may best be understood by reference to the following description taken in connection with the accompanying drawing, in which Fig. 1 represents a metal-enclosed discharge device suitably embodying the invention and Figs. 2, 3 and 4 show alternative seal constructions.

Referring particularly to Fig. 1 there is shown a two-electrode discharge device, or rectifier, having an enclosing container which consists mainly of an inverted cup-shaped metal part 10, suitably constituted of steel. This has a flange 11 at its lower end and is closed by means of a circular plate 12 hermetically joined to this flange.

Within the enclosure provided by the metal part 10 there is provided a cathode structure which includes a conductive metal tube 15 bearing on its outer surface a number of radially extending vanes 16. The tube is closed at its upper end by means of a metal cap 18 and contains a filamentary heater 19 having the purpose of maintaining the vanes 16 at an electron-emitting temperature. It is the function of the cathode structure as a whole to produce a discharge to the interior surface of the part 10, which part thus serves as an anode.

In order to provide an ionizing medium for the discharge between the cathode structure and the container, I have provided within the container a quantity of caesium as indicated at 21. This is adapted to become vaporized during the operation of the device and, when in vaporous condition, is capable of being ionized at a very low voltage, on the order of 3.9 volts. The resulting discharge is characterized by an extremely low arc drop which may be as low as one volt. Moreover, assuming the cathode vanes 16 to be constituted of an appropriate material, the caesium has the effect of greatly increasing the electron emissivity of the vane surfaces over what may be realized with uncoated vanes, and even over the best that has been realized with commonly employed coating materials. In this connection, one may use, for example, vanes consisting of nickel.

A part of the vaporized caesium is adsorbed on the nickel surface with the effect that the so-called "work-function" of the surface is very much reduced and its electron emissivity at a given temperature correspondingly increased. Moreover, the caesium layer is continually renewed during operation, so that the operating life of the cathode is practically unlimited. The overall result is that the caesium-supported discharge requires only a relatively low power input to the cathode for heating purposes, and is characterized by long life and high efficiency.

The advantageous characteristics of caesium, as stated in the foregoing, are to some degree offset by the extreme chemical activity of this material which makes it difficult to provide durable lead-in seals for the enclosed electrode elements. According to the present invention, this difficulty is overcome by the use of a composite seal having a first caesium-resistant glass component 24 which is exposed to the caesium vapor and a second glass component 25 which shields the part 24 from access to air while being itself shielded from contact with the caesium. The tube 15 which comprises the main current supply path for the cathode structure is sealed through both the glass components 24 and 25, as indicated, being brought out through the plate 12 by means of an aperture 26 formed in it.

The glass body 24 is sealed into a metal eyelet 31 which is brazed or otherwise joined to the metal plate 12 in a region surrounding the aperture 26 and which may suitably be constituted of a nickel-iron-cobalt alloy such as Fernico. A glass which is capable of being sealed to Fernico and which is further characterized by a high degree of resistance to the action of caesium vapor is one having approximately the following composition:

| | |
|---|---|
| $SiO_2$ | 34 |
| $B_2O_3$ | 34 |
| $Al_2O_3$ | 10 |
| $BaO$ | 20 |
| $K_2O$ | 2 |

This glass may be characterized generally as a borosilicate-barium glass having low alkali and silica content.

While the glass described above has good resistance to caesium, as previously stated, it is unfortunately somewhat subject to attack by moist air, and therefore tends to deteriorate if used in a situation in which exposure to air is involved. The unfavorable effects of this property are avoided in accordance with the present invention by forming the second glass seal 25 of a glass which is resistant to air. For this purpose, one may use, for example, the glass sold by the Corning Glass Works under their type designation 705AO glass, and containing the following ingredients in substantially the amounts specified: 65% silica ($SiO_2$) 23% boric oxide ($B_2O_3$), 7% sodium oxide ($Na_2O$) and 5% aluminum oxide ($Al_2O_3$). This glass is well adapted for sealing to metal (especially Fernico) and may consequently be sealed between the outer surface of the tubular conductor 15, which may be of Fernico, and the inner surface of a second Fernico eyelet 33 secured to the bottom of the plate 12 in a region surrounding the aperture 26.

With the arrangement specified it is clear that the caesium-resistant glass 24 is protected by the seal between the part 25 and its associated eyelet from any contact with the air surrounding the discharge device. For this reason, the susceptibility of this glass to attack by air is of no consequence. Conversely, the air-resistant glass 25 is fully shielded from exposure to caesium vapor so that its lack of resistance to this medium is immaterial. The overall result is, therefore, that the seal construction as a whole is capable of a long life without chemical deterioration. It is not necessary that the caesium-resistant glass should be non-resistant to air in order to obtain the advantages of the invention, since this type of seal has other important advantages, as described above.

The discharge space within the container 10 may be evacuated after the assembly of the device by means of an exhaust tubulation 34 which passes through the floor plate 12, the tubulation being sealed off when a sufficiently high degree of vacuum is attained. This tubulation may also be used as a means for introducing the caesium 21.

It is desirable in some cases to form a secondary vacuum space within the tubular conductor 15 and also within the chamber formed by the eyelets 31 and 33. This may be done by providing an exhaust tubulation 35 at the outer extremity of the current supply lead 36 which serves the cathode heater and by sealing the tubulation through a body of air-resistant glass 38 (e. g. Corning 705AO glass). The tubulation 35 connects through an appropriately located orifice 39 with the interior of the conductor 15 and through a second orifice 40 with the space enclosed by the eyelets 31 and 33. If desired, a caesium absorbent element 41 such as a body of graphite, tin oxide or copper oxide may be provided within the latter space to prevent any caesium which may leak through the seal 24 from attacking the glass 25.

In Fig. 1 the glass members 24 and 25 are sealed directly to the cathode supporting tube 15. In some cases the heat conducted down this tube from the cathode raises the temperature of the glass above its safe operating temperature. For this and other reasons I prefer to interpose between the glass and the cathode-supporting member an additional tubular metal member, as shown in Fig. 2. Here the conductor 42, which corresponds to the tube 15 of Fig. 1, is connected to glass rings 43 and 44 by metal tubes 45 and 46 which are hermetically joined both to the glass and to the conductor. The glass rings are joined to further metal tubes or sleeves 47 and 48 which are in turn welded to an apertured wall part 49. The tubular members 45 and 46 tend to limit the heat flow to the glass seals and thus protect these seals against excessive temperatures. For present purposes, the ring 43 is formed of caesium-resistant glass while the ring 44 should be air-resistant.

In the use of the device described, it is desirable to operate at a relatively high temperature (e. g. 150 to 200 degrees C.) in order to provide an adequate pressure of caesium vapor within the container 10. In order to minimize the effects of caesium vapor at these temperatures, the seals between the glass 24 and the parts 15 and 31 should contain very little of the oxide of the metal of which the latter parts are constituted, since these oxides tend to be reduced by the caesium with resultant destruction of the bond between the glass and metal. This action may cause the seal to leak and in some cases may cause fracture of the seal because of expansion caused by the substitution of large caesium atoms for the small metal atoms of the oxide.

Oxide-free seals which are not subject to this danger may be made in pure hydrogen or in an inert gas or in a mixture of an inert gas with hydrogen (e. g. 95% nitrogen with 5% hydrogen). However, if it is necessary or desirable to produce the caesium-resistant seal by heating in air (i. e. with some attendant oxidation), it is helpful to make the metal component of the seal very thin to avoid cracking due to causes described above. Such thin metal seals are preferably formed of a metal which oxidizes very little, such as platinum; or one whose oxide is not easily reduced by caesium, for example, chromium or an alloy of high chromium content. Seals which are suitable for fabrication in this way are illustrated in Figs. 3 and 4 in which only the caesium-resistant part of the seal is shown, it being assumed that each seal also includes a corresponding air-resistant part which may be of the same form as the caesium-resistant part or alternatively of the form represented by the combination of the elements 25 and 33 in Fig. 1 of the elements 44, 46 and 48 in Fig. 2. While the metal of the caesium-resistant part may be as thin as desirable, the air-resistant seal should be made of metal which is thick enough to withstand atmospheric pressure, and preferably should be strong enough to support the weight of the cathode. In this case one function of the external air-resistant seal is to protect the thin metal of the inner seal from being ruptured by the atmospheric pressure, it being understood that the space between the caesium-resistant and air-resistant components of the structure is to be evacuated.

In Fig. 3 the illustrated seal is represented in connection with a lead-in conductor 50 which corresponds to the tubular conductor 15 of Fig. 1. This extends through an aperture 51 provided in a metal plate 52 which may constitute the floor plate of an enclosed discharge device. The seal itself includes a flanged eyelet 53 which is brazed or welded to the plate 52 and which is formed of very thin metal, preferably on the order of ½ mil to 5 mils in thickness. This is sealed at its upper edge into a ring of glass 54 which is assumed to be of a caesium-resistant composition such as the borosilicate-barium glass described above. The upper edge of the glass ring 54 is sealed to a thin metal sleeve 55 which is provided at one end with a portion 55' of reduced diameter serving for attachment to the outer surface of the conductor 50.

The further modification represented in Fig. 4 comprises a lead-in conductor 60 extending through a metal wall part 61. In this case the seal includes a flanged thin metal eyelet 63 having its upper edge embedded in a ring of caesium-resistant glass 64. The glass ring 64 has a second sealed joint with a stepped sleeve 65 which is of smaller diameter than the eyelet 63 and which is hermetically joined at its upper end to the conductor 60. This seal has the advantage of being of a form which can be made by casting, according to the method described in U. S. Patent No. 2,299,750, patented October 27, 1942, by A. W. Hull and R. W. Moore. Seals cast in this manner in an atmosphere of hydrogen have been found to be very resistant to attack by caesium, but to be characterized by a weaker bond than when made in air. In the structure shown in Fig. 4 the metal and glass are so interlocked that there is very little stress at the bond, and the seal remains essentially intact even if the bond fails. In case the bond becomes loose the seal will no longer be absolutely tight, but the amount of caesium which leaks through will be so small that it can be absorbed by an absorber located in an evacuated cavity formed between the seal 64 and an air-resistant seal (not shown) formed on the other side of the wall part 61.

A further advantage of this type of seal is that it may include a certain amount of oxide at the glass-metal interface, such as would result if the seal is made in an oxidizing atmosphere. Even if this oxide should be reduced by the caesium, the seal will maintain its form and will be nearly vacuum tight, provided the amount of oxide and the thickness of the metal are limited as described above so as to avoid breaking the glass. The tin oxide or other caesium absorber (used in the manner of 41 in Fig. 1) will serve to absorb any caesium vapor that may leak through the seal as a result of reduction of the oxide layer, thus preventing it from attacking the outer seal.

While the invention has been described mainly by reference to a caesium-filled discharge device, it is clear that in its structural aspects it has utility in other electrical devices in which a chemically active operating medium is to be confined by means of a glass-to-metal seal. I therefore aim in the appended claims to cover all such variations of structure or use as come within the true spirit and scope of the foregoing disclosure.

What I claim as new and desire to secure by Letters Patent of the United States is:

1. An enclosed electrical device comprising a container, energy-converting means within the container, a chemically active medium also within the container, a lead-in conductor extending through a wall of the container and connecting with the said energy-converting means, and a metallic tubular member providing a seal for the said conductor, and having sealed thereto a first sealing glass which is exposed to the interior of the container and which is resistant to the said medium, and spaced away from said first glass a second, air-resistant sealing glass which shields said first glass from contact with air and which is shielded by said first glass from direct contact with said medium.

2. An enclosed electrical device comprising a container, energy-converting means within the container, a chemically active operating medium also within the container, a lead-in conductor extending through a wall of the container and connecting with the said energy-converting means, and a gas-tight seal for the said conductor, said seal including a first glass which is highly resistant to the said medium, and a second glass which is shielded by said first glass from contact with said medium, the space between said glasses being evacuated.

3. An enclosed electrical device comprising a metal container, energy-converting means within the container, a charge of caesium also within the container, a lead-in conductor extending through a wall of the container and connecting with the said energy-converting means, and a gas-tight seal for the said conductor, said seal including a chamber, a closure for one end thereof constituted of a glass which is highly resistant to caesium but relatively less resistant to air, and a closure for the opposite end thereof comprising an air-resistant glass which shields said first glass closure from contact with air and which is shielded by said first glass from contact with said caesium.

4. An electrical discharge device comprising a container, an electrode within the container, a chemically active metal vapor within the container serving as a discharge medium, a lead-in conductor extending through a wall of the container and connecting with the said electrode and a two-part seal for the said conductor, said seal including a first part constituted of glass which is highly resistant to said vapor, and a second part spaced from said first part and being constituted of a glass which is highly resistant to air, said second part shielding said first part from contact with air and being shielded by said first part from contact with said vapor.

5. In an electrical discharge device which employs caesium vapor as an operating medium, the combination which includes a lead-in conductor extending into the discharge device and sealing means for the said lead-in conductor comprising a first glass which is highly resistant to caesium, and a spaced second glass which is highly resistant to air but which is less resistant to caesium, the space between said glasses being evacuated, said first glass shielding said second glass from contact with caesium and said second glass shielding said first glass from contact with air.

6. In an electrical discharge device which employs an envelope containing caesium as an operating medium, the combination which includes a lead-in conductor extending into said envelope and sealing means for the said conductor comprising a first part which is exposed to the caesium and which comprises a borosilicate-barium glass of low silica and alkali content, a second part constituted of a glass which is more highly resistant to air than said borosilicate-barium glass, said second part shielding said first part from contact with air and being shielded by said first part from contact with said caesium, and a metal member hermetically sealed to said second glass part and said envelope.

7. An electrical device comprising a sealed container having a metallic wall part, energy-converting means within the container, a chemically active vapor within the container and serving as an operating medium, a lead-in conductor extending through an aperture in said metal wall part and connecting with said energy-converting means, and a vacuum-tight seal for said lead-in conductor, said seal comprising a first metal eyelet surrounding said aperture and extending toward the interior of said container, a quantity of vapor-resistant glass sealing said conductor into said eyelet, the seal between said glass and said conductor being unsuitable for exposure to air, a second metal eyelet joined to said wall part in a region surrounding said aperture and extending outwardly of the container and a second quantity of glass sealing said conductor into said second eyelet, said second glass being resistant to air.

8. A lead-in arrangement for a caesium-filled discharge device having an apertured metallic wall part, said arrangement comprising a lead-in conductor extending through the aperture in said wall part, a first metal eyelet secured to said wall part in a region surrounding said aperture and extending toward the interior of said device, a quantity of caesium-resistant glass fused between said lead-in conductor and said eyelet, the resultant seal being unsuitable for exposure to air, a second metal eyelet secured to said metal wall part in a region surrounding said aperture, and a second glass sealing said lead-in conductor into said second eyelet, said second seal being fully resistant to air.

9. A lead-in seal for a caesium-filled discharge device comprising a first component which includes a thin metal member sealed into a caesium-resistant glass, said first component being in contact with the caesium in said container, and a second component of heavier construction than said first component for shielding said first component from contact with air, said first and second components being spaced to provide a cavity between them and said cavity being evacuated.

10. A lead-in arrangement for a caesium-filled discharge device comprising a mechanically weak but caesium-resistant seal which is exposed to the caesium content of said discharge device, and a second seal of greater mechanical strength than said first component for shielding said first component from exposure to atmospheric pressure, there being an evacuated cavity between said two seals and a quantity of caesium-absorbent material in said cavity.

11. A seal for a caesium-filled discharge device comprising a metal member joined to a glass which is exposed to the caesium content of said device, said glass being chemically resistant to caesium but being subject to attack by air, said metal member also having sealed thereto a second air-resistant glass which is non-resistant to attack by caesium, said air-resistant glass being spaced from said caesium-resistant glass and providing cooperatively with said metal member an enclosure protecting said first glass from contact with the atmosphere, and a caesium-absorbent material in said enclosure.

12. A lead-in seal for a caesium vapor-containing discharge device comprising a thin-walled tubular member of platinum, a plurality of spaced glasses constituting seals for said member, one of said sealing glasses being exposed to caesium vapor when said seal is in operative position and being chemically resistant to caesium, and a second sealing glass shielding said caesium-resistant glass from contact with air and being shielded by said first glass from direct contact with caesium.

ALBERT W. HULL.